UNITED STATES PATENT OFFICE.

GEORGE W. SCOLLAY, OF NEW YORK, N. Y., ASSIGNOR TO THE SCOLLAY PRESERVING AND SHIPPING COMPANY.

METHOD OF PRESERVING MEATS.

SPECIFICATION forming part of Letters Patent No. 284,242, dated September 4, 1883.

Application filed February 13, 1883. (No specimens.)

*To all whom it may concern:*

Be it known that I, GEORGE W. SCOLLAY, of the city, county, and State of New York, have invented certain new and useful Improvements in the Art of Preserving Meat, of which the following is description in such full, clear, concise, and exact terms as will enable any one skilled in the art or science to which my invention appertains to practice the same.

This improvement is supplemental to certain inventions heretofore made by me in the art of preserving animal matter in its natural fresh state, as hereinafter more fully described. These inventions, for which patents have heretofore been granted to me, embrace and include the use of salicylic, benzoic, carbolic, boracic, and sulphurous acids, and the salts which these acids form with suitable alkalies, both in the fluid and gaseous state; also, the use of other chemicals and substances, as described in said patents, in the preservation of animal matter. The various methods of preparing and applying these and other chemicals in the treatment of uncooked meat for the purpose of preserving its normal state and taste are fully described in the Letters Patent heretofore granted to me, and especially in Patents No. 95,939, dated October 19, 1869, No. 147,984, dated February 24, 1874, and No. 187,986, dated March 6, 1877, to which reference is here made for a full understanding of the inventions to which this invention is supplemental. By all of the methods described in these patents more or less of the chemicals above mentioned are used in different combinations with other chemicals, all producing the same general result—that of preserving the natural state and taste of fresh meat to a degree more or less perfect. Now, by the use of these chemicals in the manner substantially as described in the said patents I can preserve the flesh of the animal "fresh;" but I cannot maintain its natural juicy condition and the fresh color of its surface. The juices of the meat, upon its being exposed to the atmosphere, will dry out, and the color of the surface will become dark and unnatural, making it unsalable and entailing more or less loss upon the dealer. Something more is therefore necessary to keep my meat in a commercial condition than mere chemical treatment. The meat, to be of full commercial value, must not only be kept sweet, but it must be kept juicy, and it must have the color natural to fresh meat recently cut. To complete the preservation of the meat, therefore, as well in juiciness and color as in taste, I supplement the chemical treatment with a mechanical treatment for the purpose of excluding the circulation of the atmosphere from the surface of the meat, by which I maintain the effect of the chemical treatment in the surface and avoid the evaporation of the juices of the meat. This mehanical treatment consists of wrapping, covering, or inclosing the meat in an envelope (adhesive or otherwise) or case tight enough to exclude the circulation of the atmosphere. This envelope, covering, or case may be made of any suitable material and in any desired form. It may be of wood, wax, paper, oil-cloth, metal, or anything that will effectually exclude the circulation of the atmosphere and maintain the chemical influence on the surface of the meat.

In concluding this specification I desire to say that I have used the word "fresh" as descriptive of meat or flesh in its natural state as determined by the senses, and that the invention does not relate to or embrace salt, cooked, dried, frozen, or "cured" meat of any kind; nor does it embrace or include meat which has been treated with any of that class of antiseptics the effect of which is to cure the meat, and which changes its natural fresh state or taste; nor does it embrace or include the packing of meat in an antiseptic fluid or gas for the purpose of preserving it from putrescence, or the packing of meat of any kind and in any kind of packages for the mere purpose of shipment, except meats subjected to the treatment above set forth; but the invention is in addition and supplemental to the treatment of the meat or flesh with the chemicals substantially above described, and as used by me for the preservation of meat or flesh, substantially as stated in the patents above mentioned, and the effect of which is to leave the meat in its fresh, juicy, natural state, which it is the purpose of this invention to maintain.

What I claim, therefore, and desire to secure by Letters Patent, is—

The method substantially herein described of preserving the natural state, taste, and color of meat or flesh, which method consists of first chemically treating the flesh to preserve its natural taste by the methods described, and of then incasing the flesh so treated for the purpose of preserving its natural juicy condition and color, substantially as described.

GEO. W. SCOLLAY.

Witnesses:
 AMOS BROADNAX,
 J. EGAR BULL.